US008850338B2

(12) United States Patent
Baumgart (10) Patent No.: US 8,850,338 B2
(45) Date of Patent: Sep. 30, 2014

(54) SYSTEM AND METHOD FOR SELECTION OF ANATOMICAL IMAGES FOR DISPLAY USING A TOUCH-SCREEN DISPLAY

(75) Inventor: John Baumgart, Hoffman Estates, IL (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 1843 days.

(21) Appl. No.: 11/610,591

(22) Filed: Dec. 14, 2006

(65) Prior Publication Data

US 2008/0158335 A1 Jul. 3, 2008

Related U.S. Application Data

(60) Provisional application No. 60/829,312, filed on Oct. 13, 2006.

(51) Int. Cl.
*H04N 7/14* (2006.01)
*G06F 3/0488* (2013.01)
*G06F 3/0482* (2013.01)

(52) U.S. Cl.
CPC .......... *G06F 3/0482* (2013.01); *G06F 3/04886* (2013.01)
USPC ........................ 715/764; 715/700; 348/14.03

(58) Field of Classification Search
USPC ................................ 715/700, 764; 348/14.03
See application file for complete search history.

(56) References Cited

U.S. PATENT DOCUMENTS

2006/0036125 A1* 2/2006 Viswanathan et al. .......... 600/11
2006/0113482 A1* 6/2006 Pelizzari et al. ......... 250/370.09

* cited by examiner

*Primary Examiner* — Andrea Leggett
(74) *Attorney, Agent, or Firm* — Brennan K Bradley (57) ABSTRACT

A system for selecting an anatomical image for display includes a main image display displaying at least one anatomical image; a touch-screen display; a processing unit providing a selection of graphical directories of anatomical images; and a network configured to interface the main image display with the processing unit and configured to interface the touch-screen display with the processing unit. The system displays at least one of the selection of graphical directories of anatomical images on the touch-screen display and enables selecting at least one of the selection of graphical directories from the processor without removing the anatomical image from the main image display. The touch-screen display includes a button enabling interchangeable display of the anatomical image and the selection of graphical directories of anatomical images. The system enables selecting at least one anatomical image by touching the corresponding image in the directory displayed on the touch-screen display.

23 Claims, 5 Drawing Sheets

SYSTEM AND METHOD FOR SELECTION OF ANATOMICAL IMAGES FOR DISPLAY USING A TOUCH-SCREEN DISPLAY

CROSS-REFERENCE TO RELATED APPLICATIONS

This application claims priority under 35 U.S.C. §119 to U.S. Provisional Patent Application Ser. No. 60/829,312 filed on Oct. 13, 2006 entitled "Touch-screen Selection of Images for Display", the entire contents of which are incorporated herein by reference. This application cross-references concurrently filed U.S. patent application Ser. No. 11/610,640 by John Baumgart, entitled "System and Method for Selection of Points of Interest During Quantitative Analysis Using a Touch-Screen Display", the entire contents of which are incorporated herein by reference and concurrently filed U.S. patent application Ser. No. 11/610,658 by John Baumgart, entitled "System and Method for Graphical Annotation of Anatomical Images Using a Touch Screen Display", the entire contents of which are incorporated herein by reference.

BACKGROUND

1. Technical Field

The present disclosure relates to medical imaging systems.

2. Discussion of Related Art

There are several different types of anatomical images that are displayed on a monitor display in a patient examination room during acquisition of the anatomical images. These types of images can be categorized as follows for an exemplary X-ray radiographic examination:
1) Live x-ray images;
2) Previous x-ray images; and
3) Other images or data, including a directory of images to be reviewed.

The first category, live x-ray, is not generally removed from the monitor to be substituted by other images. If a user is reviewing images from the second category, e.g., a series of previous x-ray images and wants to change to a different x-ray series of the same patient, the reviewed image is removed to display images from the third category, e.g., a graphical directory or group of small images, e.g., a 2×2, a 4×4, etc., similar to a sheet of postage stamps, is displayed from which the user will choose what to review next. The user sees the grid of small images on each of one or two of the main display monitors and then positions a cursor using a joystick of a touch-screen panel to select one to be shown full-screen. The user then selects an image for review using either a mouse or joystick. At bedside, the user positions a cursor using the joystick, followed by selecting the image using a button, which is slow and awkward.

As can be appreciated then from the foregoing description, display of a graphical directory of images during an examination or review of an examination using a monitor or main panel display upon which the images being viewed are currently displayed requires removing the images from the monitor or main panel display. Also, since it is necessary to select an object by positioning a cursor at bedside using a joystick, the selection process is cumbersome and slow.

SUMMARY

The present disclosure relates to a system for selecting an anatomical image for display. The system includes: a main image display displaying at least one anatomical image; a touch-screen display; a processing unit providing a selection of graphical directories of anatomical images; and a network configured to interface the main image display with the processing unit and configured to interface the touch-screen display with the processing unit. The system is configured to display at least one of the selection of graphical directories of anatomical images on the touch-screen display. The system may be configured to enable selecting at least one of the selection of graphical directories from the processor without removing the at least one anatomical image from the main image display. The touch-screen display may further include a button enabling interchangeable display of the at least one anatomical image and the at least one of the selection of graphical directories of anatomical images. The system may be configured to enable selecting at least one anatomical image by touching the corresponding image in the at least one of the selection of graphical image directories displayed on the touch-screen display.

The system may be configured such that following the touching of the corresponding image, the at least one anatomical image is interchangeably displayed substantially as a full-size image on the touch-screen display. The system may also be configured to enable scrolling through the graphical image directory on the touch-screen display to select the at least one anatomical image. The touching of the corresponding image on the touch-screen display may be effected by one of: a stylus; a light pen; a mouse; a display screen thumbnail; a track ball, a joystick control; and the touch-screen display being touched by a user. The system may further include a patient bed wherein the touch-screen display is positioned in proximity to the patient bed.

The present disclosure relates also to a method of selecting an anatomical image for display that includes the steps of: providing a main image display displaying at least one anatomical image; and a touch-screen display; and displaying at least one of a selection of graphical directories of anatomical images on the touch-screen display. The step of displaying at least one of a selection of graphical directories of anatomical images on the touch-screen display may be performed without removing the at least one anatomical image from the main image display. The method may further include the step of interchangeably displaying on the touch-screen display the at least one anatomical image and the at least one of the selection of graphical directories of anatomical images. Additionally, the method may further include the step of selecting at least one anatomical image by touching the corresponding image in the at least one of the selection of graphical image directories displayed on the touch-screen display.

The method may be implemented wherein the at least one anatomical image is interchangeably displayed substantially as a full-size image on the touch-screen display. Furthermore, the method may be implemented wherein the touching of the corresponding image is effected by touching the touch-screen display via one of a stylus; a light pen; a mouse; a display screen thumbnail; a track ball; a joystick control; and touching by a user. The method may further include the step of scrolling through the graphical image directory on the touch-screen display to select the at least one anatomical image.

In addition, the present disclosure relates to a touch-screen display for selecting an anatomical image for display. The touch-screen display is configured to interface with: a main image display displaying at least one anatomical image; a processing unit providing a selection of graphical directories of anatomical images; and a network configured to interface the main image display with the processing unit and configured to interface the touch-screen display with the processing unit. The touch-screen display is configured to display at least one of the selection of graphical directories of anatomical images thereon. The touch-screen display may be configured to enable selecting at least one of the selection of graphical directories from the processor without removing the at least one anatomical image from the main image display. The touch-screen display may further include a button enabling interchangeable display of the at least one anatomical image and the at least one of the selection of graphical directories of anatomical images.

The touch-screen display may be configured to enable selecting at least one anatomical image by touching the corresponding image in the at least one of the selection of graphical image directories displayed thereon. In addition, the touch-screen display may be configured such that following the touching of the corresponding image, the at least one anatomical image may be interchangeably displayed substantially as a full-size image on the touch-screen display.

BRIEF DESCRIPTION OF THE DRAWINGS

The accompanying drawings, which are incorporated in and constitute a part of this specification, illustrate embodiments of the disclosure and, together with a general description of the disclosure given above, and the detailed description of the embodiments given below, serve to explain the principles of the disclosure.

DETAILED DESCRIPTION OF EXEMPLARY EMBODIMENTS

Exemplary embodiments of the present disclosure will now be described in detail with reference to the figures, in which like reference numerals identify corresponding elements throughout the several views.

The present disclosure relates to an anatomical imaging system in which, upon selecting a directory of anatomical images to be displayed, the directory is displayed on a bedside touch-screen console, keeping the images on the main displays undisturbed. The user can select the image to be reviewed by touching the corresponding image on the directory. If the directory is too large to fit on the touch-screen, the user can page through the directory using additional buttons provided on the touch-screen. The configuration of the system with the touch-screen panel eliminates the need for removing a current image from the main display and provides a faster means of selecting an image than using a joystick.

Figure 1:
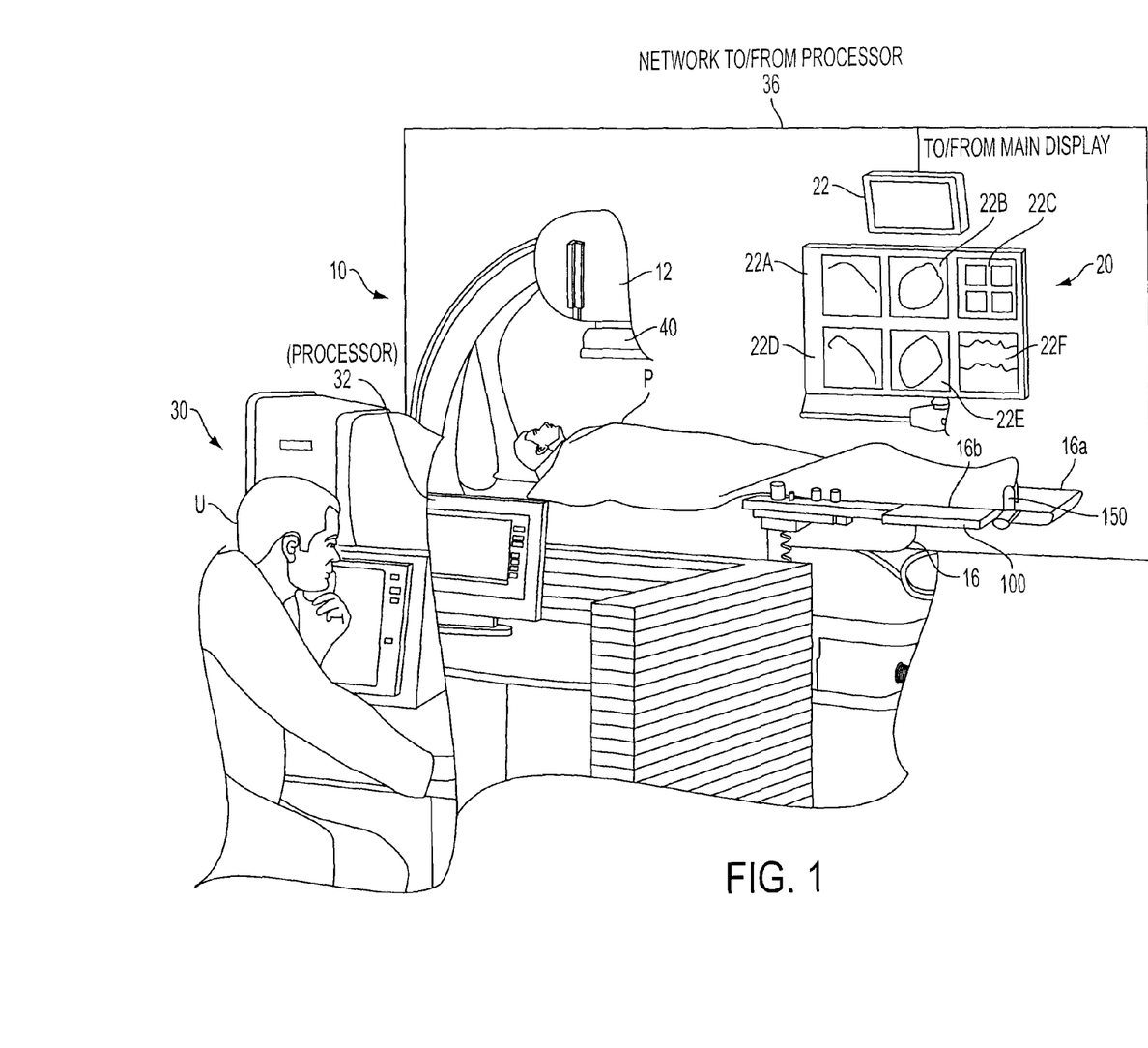
FIG. 1 is an overview of an exemplary angiographic X-ray system in a patient examination room illustrating a system user, a patient lying on a bed, main X-ray displays and a touch-screen display at the bedside.
Figure 2:
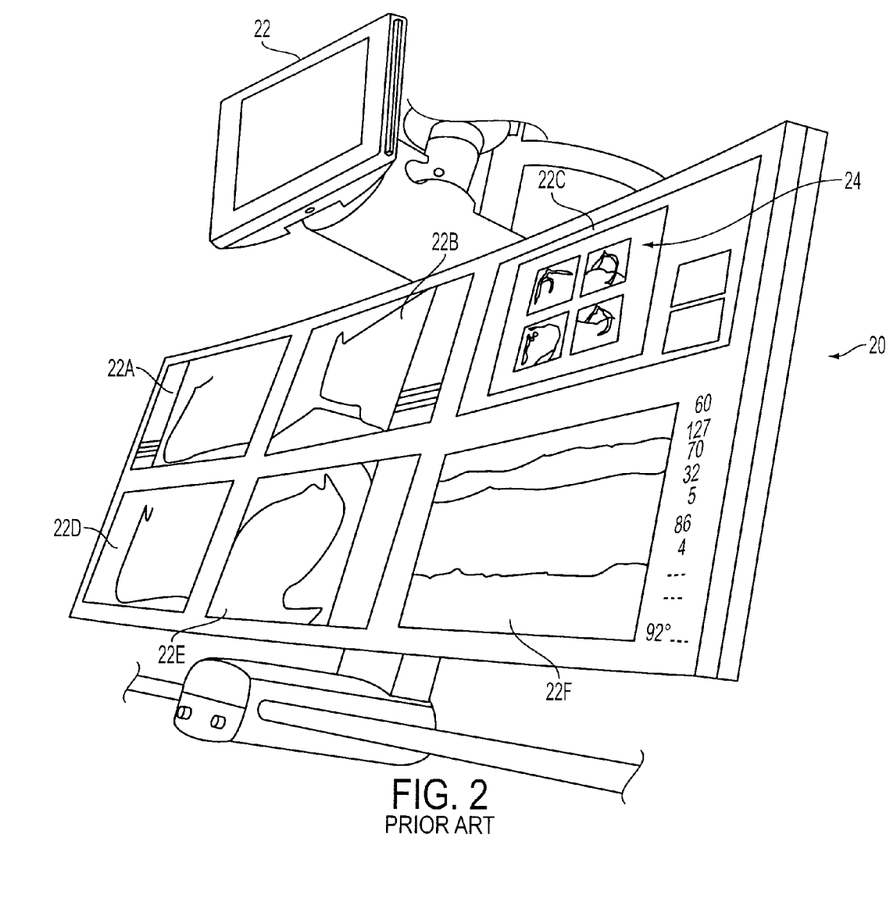
FIG. 2 is a perspective view of the main panel displays according to the prior art wherein an anatomical image has been removed from one of the panel displays and replaced by a graphical directory.
Figure 3:
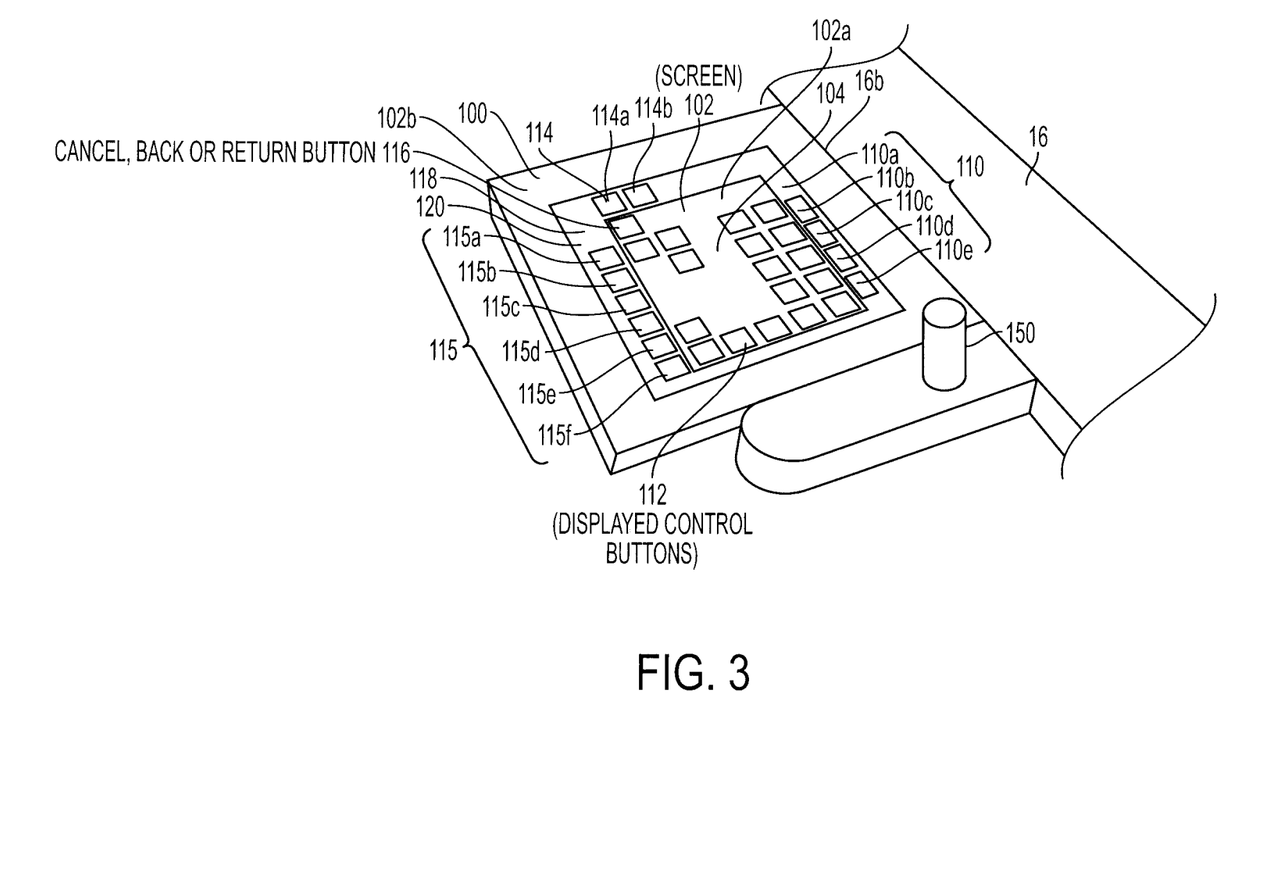
FIG. 3 is a perspective view of a touch-screen display according to the present disclosure before or after a selection process of a graphical directory of anatomical images.

Referring to FIGS. 1-3, there is illustrated an exemplary angiographic x-ray anatomical imaging system 10 as disposed in a patient examination room. A patient P is positioned on an examination bed 16. The x-ray or radiographic system 10 includes an image detector 40 supported by a support structure 12 and positioned over the examination bed 16. The image detector 40 is positioned over the patient P and over the examination bed 16 to detect the x-rays emitted from an x-ray source (not shown) under the bed 16 that enable recording the anatomical images. The radiographic system 10 includes a bank of main panel displays 20, e.g., overhead panel 22 and individual panel displays, e.g. panel displays 22A, 22B, 22C, 22C, 22D, 22E and 22F. The patient P and the main panel displays 20 are within view of a user U, e.g., a physician, seated at a control console 30. The main panel displays 20 are disposed on a distal side 16a of the examination bed 16 with respect to the user U. Panel 22C illustrates a graphical directory 24 of anatomical images in a 2×2 array that according to the prior art is displayed on main panel display 22C and so necessarily replaces a full-size anatomical image from one of the main panel displays 20 while the user U reviews the graphical directory 24 to select an image for display.

Figure 4:
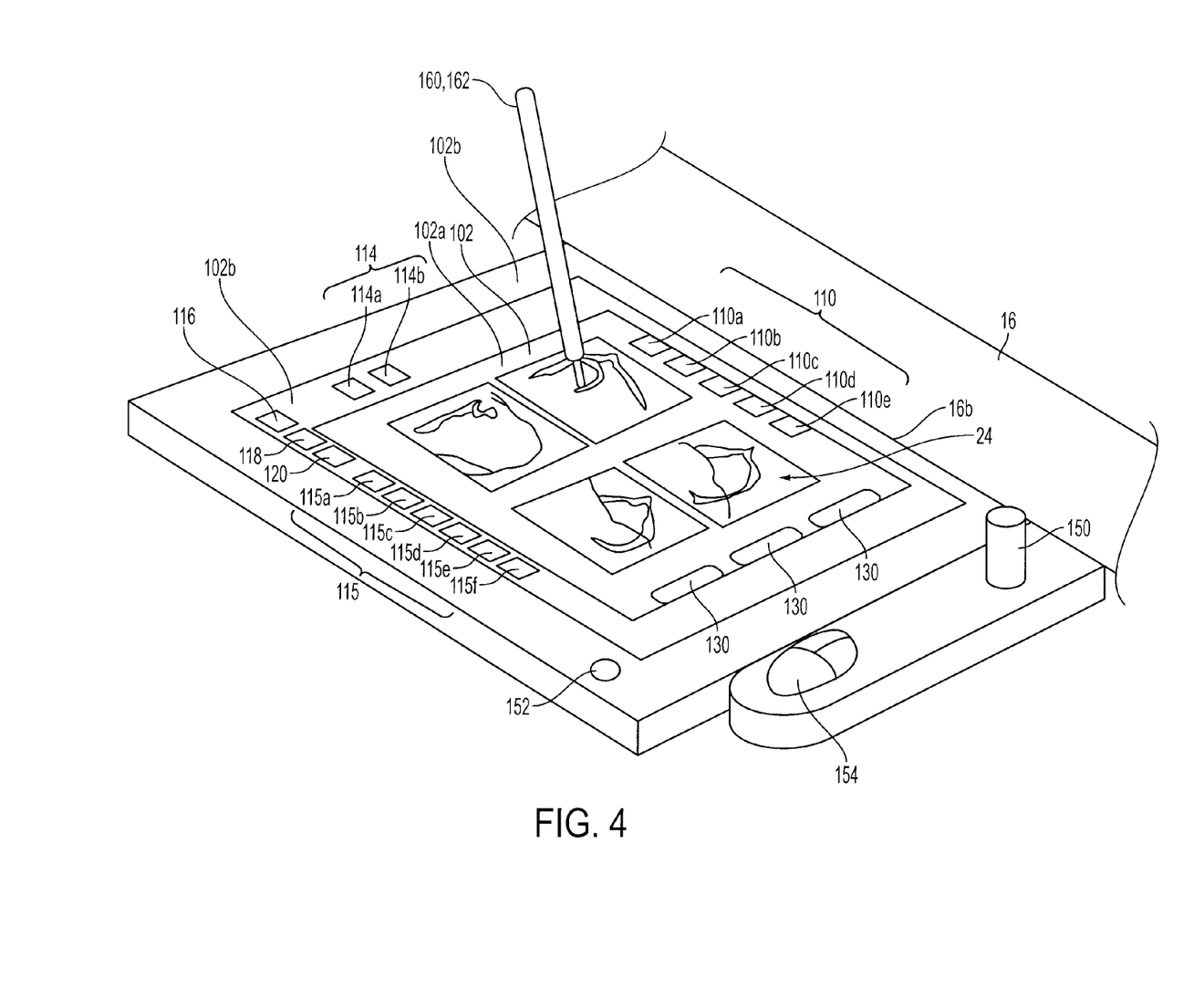
FIG. 4 is a perspective view of an exemplary graphical directory of anatomical images on the touch-screen display of FIG. 3 according to the present disclosure.
Figure 5:
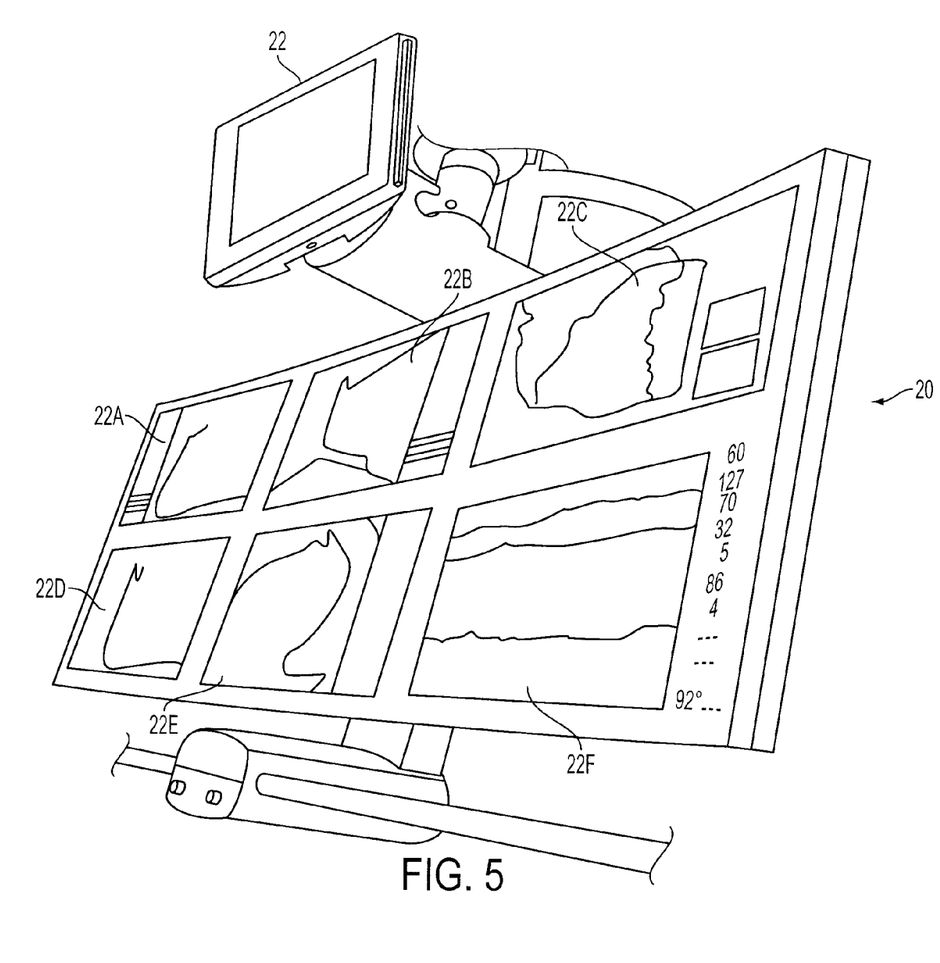
FIG. 5 is a perspective view of the main panel displays according to the present disclosure wherein the anatomical images are undisturbed during selection of the graphical directory on the touch-screen display of FIG. 4.

As best illustrated in FIGS. 3-4, the bed 16 includes a touch-screen display 100 according to the present disclosure with a joystick control 150, each disposed on a proximal side 16b of the examination bed 16. The touch-screen display 100 includes a screen 102. The screen 102 may be subdivided into a main portion 102a and a border portion 102b around the main portion 102a. The user U may be standing at the proximal side 16b of the bed 16, where the touch-screen display 100 is located, and from which location the main panel or image displays 20 are also within view of the user U.

The radiographic system 10 further includes a processing unit 32 that may be located at the control console 30 and a network 36 that is configured to interface the main image display 20 with the processing unit 32 and is also configured to interface the touch-screen display 100 with the processing unit 32.

In one embodiment, an upper edge of the border portion 102b of the screen 102 includes a strip 110 of touch buttons or tabs, e.g., touch buttons 110a, 110b, 110c, 110d, and 110e, that is disposed proximate to the proximal edge 16b of the bed 16. The border portion 102b further includes a strip 114 of touch buttons or tabs, e.g., touch buttons 114a and 114b disposed on the left side of the border portion 102b and a strip 115 of touch buttons 115a, 115b, 115c, 115d, 115e and 115f disposed on the bottom side of the border portion 102b.

When one of the touch buttons, e.g., touch button 110b, is pressed on the screen 102, a particular series 112 of control buttons is displayed as display 104 on the main portion 102a of the screen 102, as shown. If another touch button, e.g., touch button 110d is touched, a different series of control buttons (not shown) is displayed on the main portion 102a of the screen 102. However, the configuration, function, and position of touch buttons 114 on the border portion 102b does not change by touching the buttons 110a through 110e. In addition to the strips 110 and 114 of touch buttons, the screen 102 of the touch-screen display 100 further includes a "back", "cancel", or "return" button 116 that may be disposed in the border region 102b. The function of the "back", "cancel", or "return" button 116 is discussed in more detail below. Similarly, the screen 102 further includes an "Enter Selected Graphical Directory" button 118. The function of the button 118 is also discussed in more detail below.

The touch-screen display 100 may include, in addition to the joystick 150, a track ball 152 and/or a mouse 154. The mouse 154 may be wired to the processor 32 or may be operatively coupled to the processor 32 wirelessly or contactlessly, e.g., via optical, electromagnetic or acoustic waves. The mouse 154 may also be configured as a "built-in" touch pad and scroll design available for portable computers. The mouse 154 may be configured to interface concurrently with the main display 20 and the touch-screen display 100 via the processing unit 32 and the network 36 that is configured to interface the main image display 20 with the processing unit 32 and that is configured to interface the touch-screen display 100 with the processing unit 32. The embodiments are not limited in this context.

The touch-screen display 100 may also be operatively coupled to the processor 32 via a stylus 160 or light pen 162 (concurrently illustrated). The screen 102 may also display on at least one edge one or more thumbnails 130 that may be pressed for selection of the graphical directory, e.g., graphical directory 24 that is currently displayed on the touch-screen 102. The embodiments are not limited in this context.

In the embodiment of the system 10 according to the present disclosure, the processing unit 32 now provides, via the network 36, a selection of graphical directories of anatomical images, e.g., graphical directory 24, to the touch-screen display 100. The touch-screen display 100 is positioned in proximity to the bed 16, e.g., on the side 16b thereof. The selection of graphical directories is displayed on the screen 102 of the touch-screen display 100 in FIG. 4, so that the system 10 is configured to display at least one of the selection of graphical directories of anatomical images 22, 22A to 22F on the touch-screen display 100. All of the originally displayed full-size anatomical images that were displayed on the main panel display 20 prior to the selection process for the selection of graphical directories remain undisturbed on the main panel display 20 during the selection process. At least one anatomical image, e.g., image 22, 22A through 22F, is displayed on the main image display 20. The selection process now may occur at the touch-screen display 100, or at the control console 30.

More particularly, the user U can use the stylus 160 or the light pen 162 to select directly on the touch-screen 102 from the selection of graphical directories of anatomical images, thereby effecting touching of the touch-screen 102. The user U can also touch the screen 102 using a part of the user's body, e.g., one or more fingers, to select a graphical directory. In addition, the user U can use the track ball 152 or the mouse 154 also to select directly on the touch-screen 102 from the selection of graphical directories, thereby effecting the touching of the touch-screen 102. As defined herein, touching of the touch-screen 102 to select directly on the touch-screen 102 the graphical directory may also be effected by the joystick control 150. Once the user U has definitively selected a particular graphical directory of interest, the user U can then press the "Enter Selected Graphical Directory" button 118 on the touch-screen display 100. The system 10 is now configured to enable selecting on the touch-screen display 100 at least one of the selection of graphical directories from the processor 32 without removing the at least one anatomical image, e.g., images 22, 22A through 22F, from the main image display 20. In addition, referring to FIG. 4, the touch-screen display 100 further includes a "SWITCH DISPLAY" or "SWITCH DIRECTORY" button 120 that enables interchangeable display of the at least one anatomical image, e.g., images 22, 22A through 22F, and the at least one of the selection of graphical directories 24 of anatomical images. The at least one anatomical image, e.g., images 22, 22A through 22F, may be interchangeably displayed as a full-size image on the touch-screen display 100. To maintain the order of the anatomical images 22, 22A to 22F, the system 10 may be configured via software residing on the processor 32 or accessible thereto via the network 36 to decide which one of the bank of main panel displays 20 the specific image should be displayed upon, although it is also possible to display the specific image on other displays of the main image display 20, if so desired.

The system 10 is configured to enable selecting at least one anatomical image, e.g., images 22A through 22F, by touching the corresponding image in the at least one of the selection of graphical image directories, e.g., directory 24, displayed on the touch-screen display 100. The touching the corresponding image is effected by the methods described above. In addition, the system 10 is configured to enable scrolling through the graphical image directory, e.g., directory 24, on the touch-screen display 100 to select at least one anatomical image, e.g., images 22A through 22F. As defined herein, scrolling is the act of moving through the graphical image directories, e.g., directory 24, either up or down, diagonally, or sideways.

Referring again to FIGS. 1-5, the present disclosure relates also to the touch-screen display 100 for selecting an anatomical image for display. More particularly, the touch-screen display 100 may be configured to interface with the main image display 20 displaying at least one anatomical image, e.g., images 22, 22A through 22F. The touch-screen display 100 may also interface with the processing unit 32 providing a selection of graphical directories of anatomical images 22, 22A through 22F and the network 36 that is configured to interface the main image display 20 with the processing unit 32 and is configured to interface the touch-screen display 20 with the processing unit 32. The touch-screen display 100 may be configured to display at least one of the selection of graphical directories, e.g., directory 24, of anatomical images thereon, e.g., images 22, 22A through 22F. The touch-screen display 100 may be configured to enable selecting at least one of the selection of graphical directories, e.g., directory 24, from the processor 32 without removing the at least one anatomical image, e.g., image 22B, from the main image display 20. The touch-screen display 100 may further include button 120 enabling interchangeable display of the at least one anatomical image, e.g., images 22, 22A through 22F, and the at least one of the selection of graphical directories, e.g., directory 24 of anatomical images. The at least one anatomical image, e.g., images 20, 22A through 22F, may be interchangeably displayed as a full-size image on the touch-screen display 100. The touch-screen display 100 may be configured to enable selecting at least one anatomical image by touching the corresponding image in the at least one of the selection of graphical image directories displayed thereon. In addition, the touch-screen display 100 is configured to enable scrolling through the graphical image directory on the screen 102 of the touch-screen display 100 to select at least one anatomical image of interest. The touching of the corresponding image on the touch-screen display 100 may be effected by the stylus 160 or light pen 162, or by the mouse 154, a display screen thumbnail 130, or the track ball 152, or by touching the screen 102 by the user U using a part of the user's body, e.g., one or more fingers.

The present disclosure relates also to a method of selecting an anatomical image for display. More particularly, the method includes the steps of providing the main image display 20 displaying at least one anatomical image, e.g., images 22, 22A through 22F, and the touch-screen display 100. The method also includes the steps of displaying at least one of the selection of graphical directories, e.g., directory 24, of anatomical images on the touch-screen display 100. The step of displaying at least one of the selection of graphical directories of anatomical images, e.g., images 22, 22A through 22F, on the touch-screen display 100 is performed without removing an anatomical image from the main image display 100. The method may include the step of interchangeably displaying on the touch-screen display 100 the at least one anatomical image, e.g., images 22, 22A through 22F, and the at least one of the selection of graphical directories, e.g., directory 24, of anatomical images. The at least one anatomical image, e.g., images 22, 22A through 22F, may be interchangeably displayed as a full-size image on the touch-screen display 100. The method may also include selecting at least one anatomical image, e.g., images 22, 22A through 22f, by touching the corresponding image in the at least one of the selection of graphical image directories, e.g., directory 24, displayed on the touch-screen screen display 100. Also, the method may include scrolling through the graphical image directory, e.g., directory 24, on the touch-screen display 100, to select the at least one anatomical image, e.g., images 22, 22A through 22F. The touching of the corresponding image on the touch-screen display 100 may be effected by the stylus 160 or light pen 162, or by the mouse 154, a display screen thumbnail 130, or the track ball 152. The user U can also touch the touch screen 102 using a part of the user's body, e.g., one or more fingers to touch the corresponding image.

Although the anatomical image described herein is disclosed with respect to exemplary angiographic x-ray system 10, the embodiments of the present disclosure may be applied to other anatomical images and imaging systems such as, but not limited to, computer assisted tomography (CAT), magnetic resonance imaging (MRI), positron emission tomography (PET) and acoustic or sonogram images.

As can be appreciated from the above description, displaying the grid or graphical directory of anatomical images on the touch-screen display, where the directories and the individual images can be selected by touch, does not require removing any of the full-screen images from the main display, and consequently facilitates the selection of a new series of graphical directories by replacing the joystick interface with the touch screen.

It will be understood that various modifications may be made to the embodiments disclosed herein. For example, although the above embodiments are described with reference to one particular configuration of the system, method and main panel and touch-screen displays, the embodiments of the present disclosure may find application in conjunction with a system, method and main panel and touch-screen displays having many different configurations. Accordingly, it is contemplated that the disclosure is not limited to such an application and may be applied to various embodiments.

What is claimed is:

1. An X-ray imaging system for selecting an anatomical image for display during a radiographic examination, the system comprising:
    a main image display displaying at least one anatomical image provided by an X-ray imaging system;
    a touch-screen display located in close proximity and substantially adjacent a patient examination bed and at a different location than said main image display and being separate from said main image display, said touch screen display and said main image display being in the same room together with said patient examination bed and said main image display being separated and more distant from said patient examination table than said touch screen display;
    a processing unit providing a selection of graphical directories of X-ray anatomical images for presentation of an image on said touch screen display, said graphical directories indicating a plurality of different anatomical images interchangeably displayable in full size on said main image display in response to user command; and
    a network configured to interface the main image display with the processing unit and configured to interface the touch-screen display with the processing unit,
    wherein the system is configured to display a full size X-ray anatomical image on said main image display in response to user selection of at least one image using at least one of the selection of graphical directories of X-ray anatomical images on the touch-screen display.

2. The system according to claim 1, wherein
    said touch-screen display is substantially in physical contact with said patient examination bed and
    the system is configured to interchangeably display said graphical directories on said touch screen or said main image display in response to user command via a button presented on said touch screen display and to enable selecting at least one of the selection of graphical directories from the processor without removing the at least one anatomical image from the main image display.

3. The system according to claim 1, wherein the touch-screen display further comprises a button enabling interchangeable display of the at least one anatomical image and the at least one of the selection of graphical directories of anatomical images.

4. The system according to claim 1, wherein
    the system is configured to enable selecting at least one anatomical image by touching the corresponding image in the at least one of the selection of graphical image directories displayed on the touch-screen display.

5. The system according to claim 4, wherein
    the system is configured such that following the touching of the corresponding image, the at least one anatomical image is interchangeably displayed substantially as a full-size image on the touch-screen display.

6. The system according to claim 4, wherein
    the system is configured to enable scrolling through the graphical image directory on the touch-screen display to select the at least one anatomical image.

7. The system according to claim 4, wherein the touching of the corresponding image on the touch-screen display is effected by one of (a) a stylus; (b) a light pen; (c) a mouse; (d) a display screen thumbnail; (e) a track ball, (f) a joystick control; and (g) the touch-screen display being touched by a user.

8. The system according to claim 1, further comprising a patient examination bed wherein said touch-screen display is located at the side of the patient examination bed and said main image display comprises a bank of overhead panel displays.

9. A method of selecting an anatomical image for display during a radiographic examination comprising the steps of:
    providing:
        a main image display displaying at least one anatomical image provided by an X-ray imaging system and comprising an overhead panel display separated from a patient examination bed;
        a touch-screen display located in close proximity and substantially adjacent a patient examination bed and at a different location than said main image display and being separate from said main image display, said touch screen display and said main image display being in the same room together with said patient examination bed and said main image display being separated and more distant from said patient examination table than said touch screen display;
    displaying at least one of a selection of graphical directories of X-ray anatomical images on the touch-screen display, said graphical directories indicating a plurality of different anatomical images interchangeably displayable in full size on said main image display in response to user command; and displaying a full size X-ray anatomical image on said main image display in response to user selection of at least one image using at least one of the selection of graphical directories of X-ray anatomical images on the touch-screen display.

10. The method according to claim 9, wherein said touch-screen display is substantially in physical contact with said patient examination bed and the step of displaying at least one of a selection of graphical directories of anatomical images on the touch-screen display is performed without removing the at least one anatomical image from the main image display and including the step of interchangeably displaying said graphical directories on said touch screen or said main image display in response to user command via a button presented on said touch screen display.

11. The method according to claim 9, further comprises the step of interchangeably displaying on the touch-screen display the at least one anatomical image and the at least one of the selection of graphical directories of anatomical images.

12. The method according to claim 9, further comprising the step of:

selecting at least one anatomical image by touching the corresponding image in the at least one of the selection of graphical image directories displayed on the touch-screen display.

13. The method according to claim 11, wherein the at least one anatomical image is interchangeably displayed substantially as a full-size image on the touch-screen display.

14. The method according to claim 12, wherein the touching of the corresponding image is effected by touching the touch-screen display via one of (a) a stylus; (b) a light pen; (c) a mouse; (d) a display screen thumbnail; (e) a track ball; (f) a joystick control; and (g) touching by a user.

15. The method according to claim 12, further comprising the step of:

scrolling through the graphical image directory on the touch-screen display to select the at least one anatomical image.

16. A touch-screen display for selecting an X-ray anatomical image for display during a radiographic examination, the touch-screen display configured to interface with:

a main image display displaying at least one anatomical image provided by an X-ray imaging system, said touch screen display and said main image display being in the same room together with said patient examination bed and said main image display being separated and more distant from said patient examination table than said touch screen display;

a processing unit providing a selection of graphical directories of X-ray anatomical images for presentation of an image on said touch screen display, said graphical directories indicating a plurality of different X-ray anatomical images interchangeably displayable in full size in response to user command; and a network configured to interface the main image display with the processing unit and configured to interface the touch-screen display with the processing unit, wherein the touch-screen display is located substantially adjacent a patient examination bed and at a different location than said main image display and being separate from said main image display and is configured to display at least one of the selection of graphical directories of anatomical images thereon and a full size anatomical image is displayed on said main image display in response to user selection of at least one image using at least one of the selection of graphical directories of X-ray anatomical images on the touch-screen display.

17. The touch-screen display according to claim 16, wherein said touch-screen display is substantially in physical contact with said patient examination bed and the touch-screen display is configured to enable selecting at least one of the selection of graphical directories from the processor without removing the at least one anatomical image from the main image display and said graphical directories are interchangeably displayed on said touch screen or said main image display in response to user command via a button presented on said touch screen display.

18. The touch-screen display according to claim 16, wherein the touch-screen display further comprises a button enabling interchangeable display of the at least one anatomical image and the at least one of the selection of graphical directories of anatomical images.

19. The touch-screen display according to claim 16, wherein the touch-screen display is configured to enable selecting at least one anatomical image by touching the corresponding image in the at least one of the selection of graphical image directories displayed thereon.

20. The touch-screen display according to claim 19, wherein the touch-screen display is configured such that following the touching of the corresponding image, the at least one anatomical image is interchangeably displayed substantially as a full-size image on the touch-screen display.

21. The touch-screen display according to claim 19, wherein the touch-screen display is configured to enable scrolling through the graphical image directory on the touch-screen display to select the at least one anatomical image.

22. The touch-screen display according to claim 19, wherein the touching of the corresponding image on the touch-screen display is effected by one of (a) a stylus; (b) a light pen; (c) a mouse; (d) a display screen thumbnail; (e) a track ball; (f) a joystick control; and (g) the touch-screen display being touched by a user.

23. The touch-screen display according to claim 16, wherein the touch-screen display is located at the side of a patient examination bed and said main image display comprises a bank of overhead panel displays.

* * * * *